(12) United States Patent
Tsirkin et al.

(10) Patent No.: US 9,990,216 B2
(45) Date of Patent: Jun. 5, 2018

(54) PROVIDING HYPERCALL INTERFACE FOR VIRTUAL MACHINES

(71) Applicant: Red Hat Israel, Ltd., Raanana (IL)

(72) Inventors: Michael S. Tsirkin, Yokneam Yillit (IL); Gleb Natapov, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 365 days.

(21) Appl. No.: 13/928,587

(22) Filed: Jun. 27, 2013

(65) Prior Publication Data

US 2015/0007170 A1     Jan. 1, 2015

(51) Int. Cl.
    *G06F 9/455* (2018.01)
    *G06F 9/44* (2018.01)
(52) U.S. Cl.
    CPC ........ *G06F 9/45533* (2013.01); *G06F 9/4426* (2013.01); *G06F 9/45558* (2013.01)
(58) Field of Classification Search
    USPC ........................................................ 718/1
    See application file for complete search history.

(56) References Cited

U.S. PATENT DOCUMENTS

| | | | |
|---|---|---|---|
| 8,327,354 B1* | 12/2012 | Magenheimer et al. ......... | 718/1 |
| 8,392,628 B2 | 3/2013 | Santos et al. | |
| 9,003,402 B1* | 4/2015 | Carbone et al. .................. | 718/1 |
| 2006/0248528 A1* | 11/2006 | Oney et al. ........................ | 718/1 |
| 2009/0113110 A1 | 4/2009 | Chen et al. | |
| 2010/0299665 A1 | 11/2010 | Adams | |
| 2011/0113180 A1 | 5/2011 | Park et al. | |
| 2011/0320825 A1* | 12/2011 | Greiner et al. ............... | 713/190 |
| 2012/0254865 A1* | 10/2012 | Saeki .................. | G06F 9/45533 718/1 |
| 2013/0061012 A1* | 3/2013 | Turner .................... | G06F 21/57 711/159 |
| 2013/0086550 A1 | 4/2013 | Epstein | |
| 2013/0339953 A1* | 12/2013 | Wibling et al. .................... | 718/1 |

FOREIGN PATENT DOCUMENTS

| | | | | |
|---|---|---|---|---|
| WO | WO 2011152816 A1 * | 12/2011 | ............. | G06F 21/52 |
| WO | 12129729 | 10/2012 | | |

OTHER PUBLICATIONS

John McDermott, Bruce Montrose, Margery Li, James Kirby, Myong Kang; "Separation Virtual Machine Monitors"; ACM 978-1-4503-1312-4/12/12.*
Vrabel, D., Mailing List Archive: Xen: Devel, Feb. 21, 2013, (http://www.gossamer-threads.com/lists/xen/devel/272422?do=post_view_flat).
Gruskovnjak, J., Advanced Exploitation of Xen Hypervisor Sysret VM Escape Vulnerability, Sep. 4, 2012, (http://www.vupen.com/blog/20120904.
Advanced_Exploitation_of_Xen_Sysret_VM_Escape_CVE-2012-0217.php).
Wojtczuk, R., Subverting the Xen Hypervisor, Aug. 7, 2008, http://invisiblethingslab.com/resources/bh08/part1.pdf.

(Continued)

*Primary Examiner* — Wynuel Aquino
(74) *Attorney, Agent, or Firm* — Lowenstein Sandler LLP

(57) ABSTRACT

Systems and methods for providing a hypercall interface for virtual machines. An example method may comprise receiving, by a hypervisor executing on a computer system, a hypercall instruction issued by a virtual machine to invoke a hypervisor function; and determining an identifier of the hypervisor function based on a value of an instruction pointer of the virtual machine.

15 Claims, 4 Drawing Sheets

(56) References Cited

OTHER PUBLICATIONS

2008 Microsoft Corporation, Hypervisor Functional Specification, Jun. 26, 2008, http://download.microsoft.com/download/4/5/2/45275C52-93A9-4A29-BDBC-45DC1C82BC1D/Hypervisor%20Top%20Level%20Functional%20Specification%20v1.0.docx.

Index: kernel/git/torvalds/linus.git—Linux kernel source tree, Jul. 16, 2013, https://git.kernel.org/?p=linux/kernel/git/torvalds/linux-2.6.git;a=blob;f=Documentation/virtual/kvm/hypercalls.txt;hb=HEAD.

HVM hypercalls, Jul. 13, 2013, http://xen.1045712.n5.nabble.com/HVM-hypercalls-td2541346.html.

* cited by examiner

PROVIDING HYPERCALL INTERFACE FOR VIRTUAL MACHINES

TECHNICAL FIELD

The present disclosure is generally related to virtualized computer systems, and is more specifically related to systems and methods for providing a hypercall interface for virtual machines.

BACKGROUND

"Virtualization" herein refers to abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for providing a hypercall interface for virtual machines. "Hypercall" herein refers to a mechanism allowing a virtual machine to invoke a hypervisor function (e.g., a software interrupt instruction). A hypercall interface may be implemented by a code page residing within the guest virtual address (GVA) space of the virtual machine. The hypercall page may contain a plurality of hypercall entries. In certain implementations, a hypercall entry may include a hypercall invocation instruction (e.g., a VMCALL/VMMCALL instruction) preceded by an instruction storing an identifier of the function to be invoked via the hypercall in a designated general purpose register (e.g., EAX). Other input and/or output parameters may be passed via the remaining general purpose registers. A hypercall may be invoked by the virtual machine by issuing a call or a jump instruction to the address of a hypercall entry corresponding to the selected hypercall function. Upon completion of the hypercall function, the execution flow may be returned to the virtual machine via a virtual machine re-entry (e.g., VMENTER) instruction.

In certain implementations, to free up the general purpose register which would otherwise be employed for holding the hypercall function identifier, the latter may be determined by the hypervisor based on the value of the virtual machine's instruction pointer (e.g., RIP register). Upon executing the hypercall invocation instruction, the virtual machine's instruction pointer would contain the address of the hypercall entry within the hypercall page. Hence, the hypervisor may derive the identifier of the desired hypercall function from the value of the virtual machine's instruction pointer. In one illustrative example, the number of the hypercall function to be invoked may be calculated as the difference between the value of the virtual machine's instruction pointer and the address of the start of the hypercall page within the virtual machine's address space, optionally divided by the size of a hypercall entry. Thus, the general purpose register which would otherwise be employed for holding the hypercall function identifier, may be used for passing other hypercall parameters, which might be useful in view of the limited number of general purpose registers in many processor architectures. Various aspects of the above referenced methods and systems are described in details herein below by way of examples, rather than by way of limitation.

Figure 1:
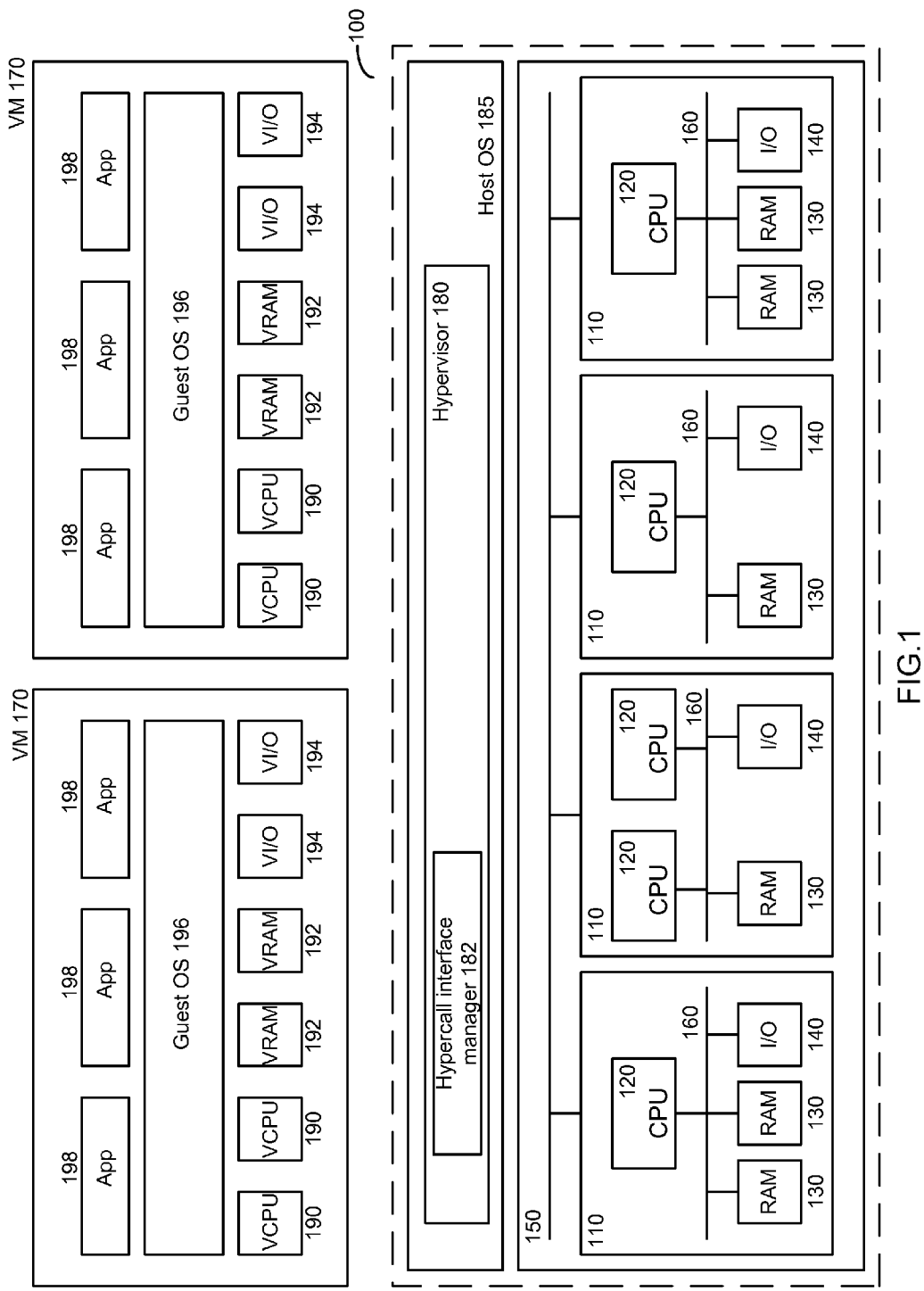
FIG. 1 depicts a high-level component diagram of one illustrative embodiment of a multi-processor computer system 100, in accordance with one or more aspects of the present disclosure.

FIG. 1 depicts a high-level component diagram of one illustrative embodiment of a multi-processor computer system 100 in accordance with one or more aspects of the present disclosure. The computer system 100 may include one or more interconnected nodes 110. "Node" herein refers to a group of one or more processors and one or more associated memory devices locally accessible by the processors in the group. Each node 110 may in turn include one or more physical processors 120 communicatively coupled to memory devices 130 and input/output (I/O) devices 140.

"Physical processor" or "processor" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between one or more processor pins and an external device capable of inputting and/or outputting binary data.

Processors 120 may be interconnected using a variety of techniques, ranging from a point-to-point processor interconnect to a system area network 150, as shown in FIG. 1. Local connections within each node 110, including the connections between a processor 120 and a memory 130 and between a processor 120 and an I/O device 140 may be provided by one or more local buses 160 of suitable architecture.

As noted herein above, computer system 100 may run multiple virtual machines 170, by executing a software layer 180, often referred to as "hypervisor," above the hardware and below the virtual machines, as schematically shown in FIG. 1. In one illustrative example, the hypervisor 180 may be a component of the operating system 185 executed by the host computer system 100. Alternatively, the hypervisor 180 may be provided by an application running under the host operating system 185, or may run directly on the host computer system 100 without an operating system beneath it. The hypervisor 180 may abstract the physical layer, including processors, memory, and I/O devices, and present this abstraction to virtual machines 170 as virtual devices, including virtual processors 190, virtual memory 192, and virtual I/O devices 194.

A virtual machine 170 may execute a guest operating system 196 which may utilize the underlying virtual devices 190, 192, and 194, each of which may map to a device of the host machine (e.g., a network interface device, a CD-ROM drive, etc.). One or more applications 198 may be running on a virtual machine 170 under the guest operating system 196.

A virtual machine 170 may include one or more virtual processors 190. Processor virtualization may be implemented by the hypervisor 180 scheduling time slots on one or more physical processors 120 such that from the guest operating system's perspective those time slots are scheduled on a virtual processor 190. Memory virtualization may be implemented by a page table (PT) which is a memory structure translating virtual memory addresses to physical memory addresses.

The hypervisor 180 may run at a higher privilege level than the guest operating systems 196, and the latter may run at a higher privilege level than the guest applications 198. In certain implementations, the hypervisor may run at ring 0, the guest operating systems may run at ring 1, and the guest applications may run at ring 3. The hypervisor 180 may include a hypercall interface manager component 182 designated to provide a procedural architecture-independent hypercall interface for the virtual machines' interaction with the hypervisor. Examples of hypercall functions which may be invoked by a virtual machine 170 via the hypercall interface include memory management requests, virtual processor management requests, virtual interrupts management requests, and/or messaging between two or more virtual machines.

Various hypervisors may employ various processor instructions to invoke a hypercall. To abstract from the virtual machines these differences between various hypervisor-specific hypercall invocation implementations, a hypervisor may create a hypercall page in the guest virtual address (GVA) space. In certain implementations, the location of the page may be specified by the guest, e.g., via an architecture-specific register, such as MSR register.

Figure 2:
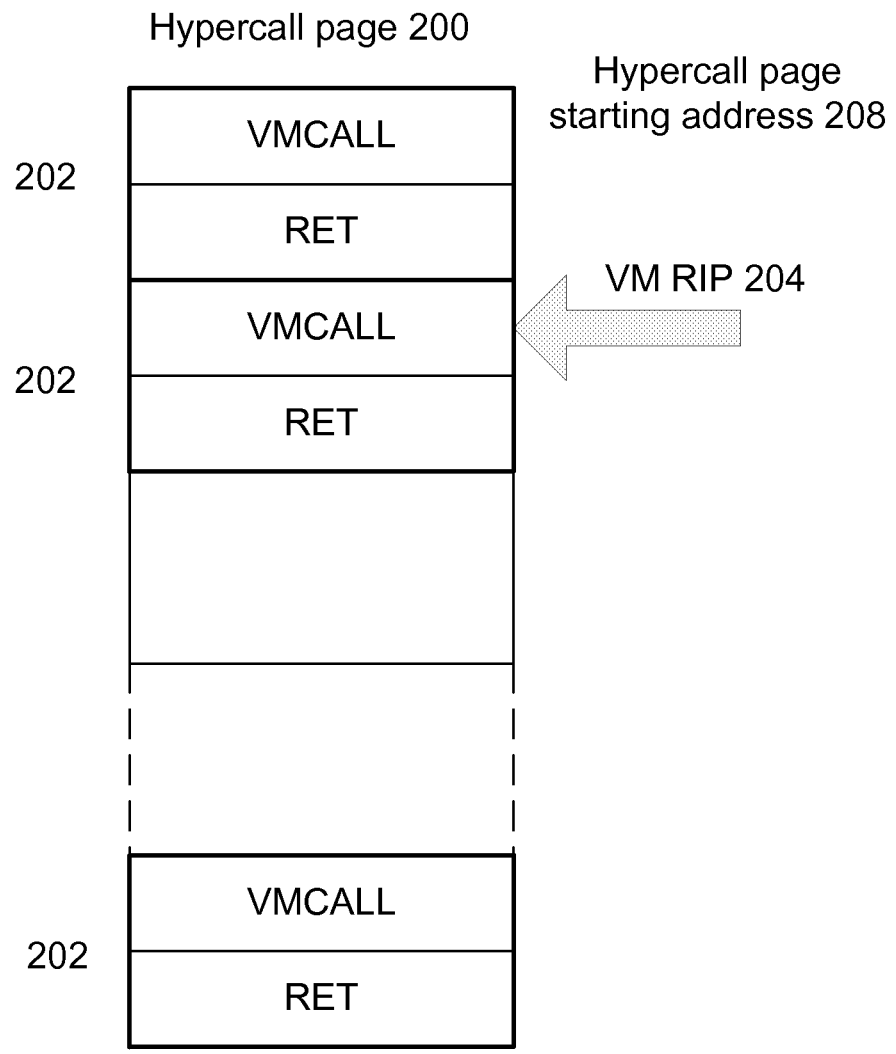
FIG. 2 schematically illustrates the mechanism of deriving the hypercall function identifier from the contents of the virtual machine's instruction pointer, in accordance with one or more aspects of the present disclosure.

FIG. 2 schematically illustrates the mechanism of deriving the hypercall function identifier from the contents of the virtual machine's instruction pointer, in accordance with one or more aspects of the present disclosure. The hypercall page 200 may contain a plurality of hypercall entries 202. Each hypercall entry 202 may include a hypercall invocation instruction (e.g., VMCALL/VMMCALL instruction).

The virtual machine may invoke a hypercall by transferring control (e.g., by a call instruction or a jump instruction) to the address of a hypercall entry corresponding to the desired hypercall function. The mapping of the hypercall entries to the hypercall functions can be published as a part of the hypervisor documentation.

Before executing the call to a selected hypercall entry, the virtual machine may assign values of one or more input parameters to one or more general purpose registers. In certain implementations the hypercall function identifier may be passed via a pre-defined general purpose register (e.g., EAX). Alternatively, in the implementation schematically represented by FIG. 2, the hypercall identifier is determined by the hypervisor based on the value of the virtual machine's instruction pointer (e.g., RIP register). Hence, the general purpose register which would otherwise be employed for holding the hypercall function identifier may be used, e.g., for passing the hypercall parameters, which might be useful in view of the limited number of general purpose registers in many processor architectures.

As noted herein above, a hypercall may be invoked by the virtual machine's transferring control (e.g., by executing a call or a jump instruction) to the address of the selected hypercall entry 202 in the hypercall page 200. Hence, upon executing the hypercall invocation instruction (e.g., VMCALL/VMMCALL instruction), the virtual machine's instruction pointer would contain the address of the hypercall entry within the GVA space.

Thus, the hypervisor may derive the identifier of the hypercall function to be invoked from the value of the virtual machine's instruction pointer. In the illustrative example of FIG. 2, the number of the hypercall function to be invoked may be provided by the hypercall entry number within the hypercall page, which may be calculated as the difference between the value of the virtual machine's instruction pointer 204 and the address 208 of the start of the hypercall page within the GVA space, optionally divided by the size of the hypercall entry.

In a further aspect, a hypervisor may emulate various hypervisor types. In one illustrative example, KVM hypervisor may support native KVM hypercalls and may further emulate Hyper-V and/or Xen hypercall interface. Depending upon the hypervisor type, a subset of bits of the virtual machine's instruction pointer may be employed for determining the identifier of the hypercall function to be invoked. In one illustrative example, KVM hypervisor may determine the identifier of the hypercall function to be invoked based on the lower 12 bits of the virtual machine's instruction pointer.

Upon completion of the hypercall function, the execution flow may be returned to the virtual machine via a virtual machine re-entry (e.g., VMENTER) instruction. The hypervisor may pass back to the virtual machine one or more hypercall output parameters via one or more registers of the virtual machine.

Figure 3:
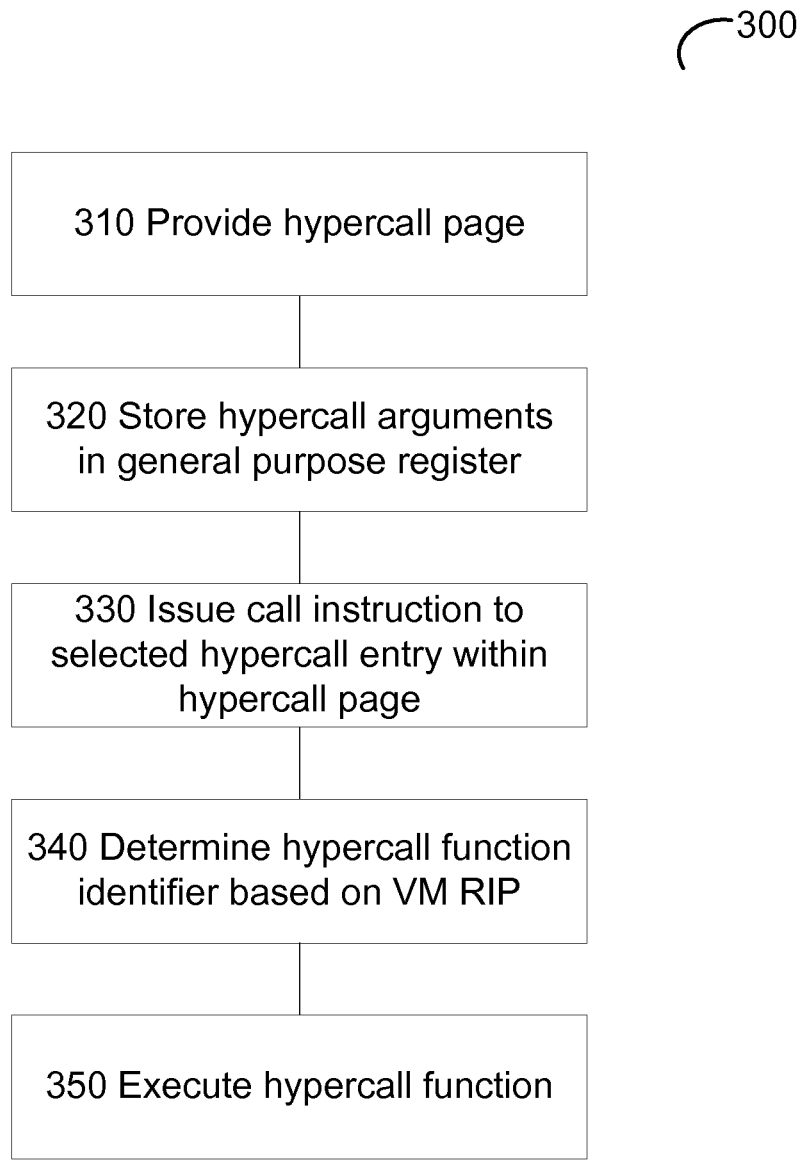
FIG. 3 depicts a flow diagram of a method for providing a hypercall interface for virtual machines, in accordance with one or more aspects of the present disclosure.

FIG. 3 depicts a flow diagram of one embodiment of a method 300 for providing a hypercall interface for virtual machines. The method 300 may be performed by a computer system that may comprise hardware (e.g., circuitry, dedicated logic, and/or programmable logic), software (e.g., instructions executable on a computer system to perform hardware simulation), or a combination thereof. The method 300 and/or each of its individual functions, routines, subroutines, or operations may be performed by one or more physical processors of the computer system executing the method.

At block 310, a computer system may create a hypercall page comprising a plurality of hypercall entries. In one illustrative example, the hypercall page may be created in a GVA space by a hypervisor running on the computer system. Alternatively, the hypercall page may be created by a virtual machine executing under the hypervisor. As noted herein above, each hypercall entry may comprise a hypercall invocation instruction.

At block 320, a virtual machine executing on the computer system may store, in a general purpose register, one or more arguments for a hypercall to be invoked by the virtual machine.

At block 330, the virtual machine may execute a hypercall by transferring control (e.g., by issuing a call or a jump instruction) to the selected hypercall entry within the hypercall page. Upon executing the hypercall invocation instruction, the flow control may be transferred to the hypervisor.

At block 340, the hypervisor may determine an identifier of the hypervisor function to be executed, based on the value of the virtual machine's instruction pointer. In one illustrative example, the function identifier may be represented by the difference between the value of the instruction pointer of the virtual machine and the address of the hypercall page in the GVA space, optionally divided by the size of a hypercall entry.

At block 350, the hypervisor may execute the hypervisor function identified by the function identifier. Upon completing the operations schematically described by block 350, the method may terminate.

Figure 4:
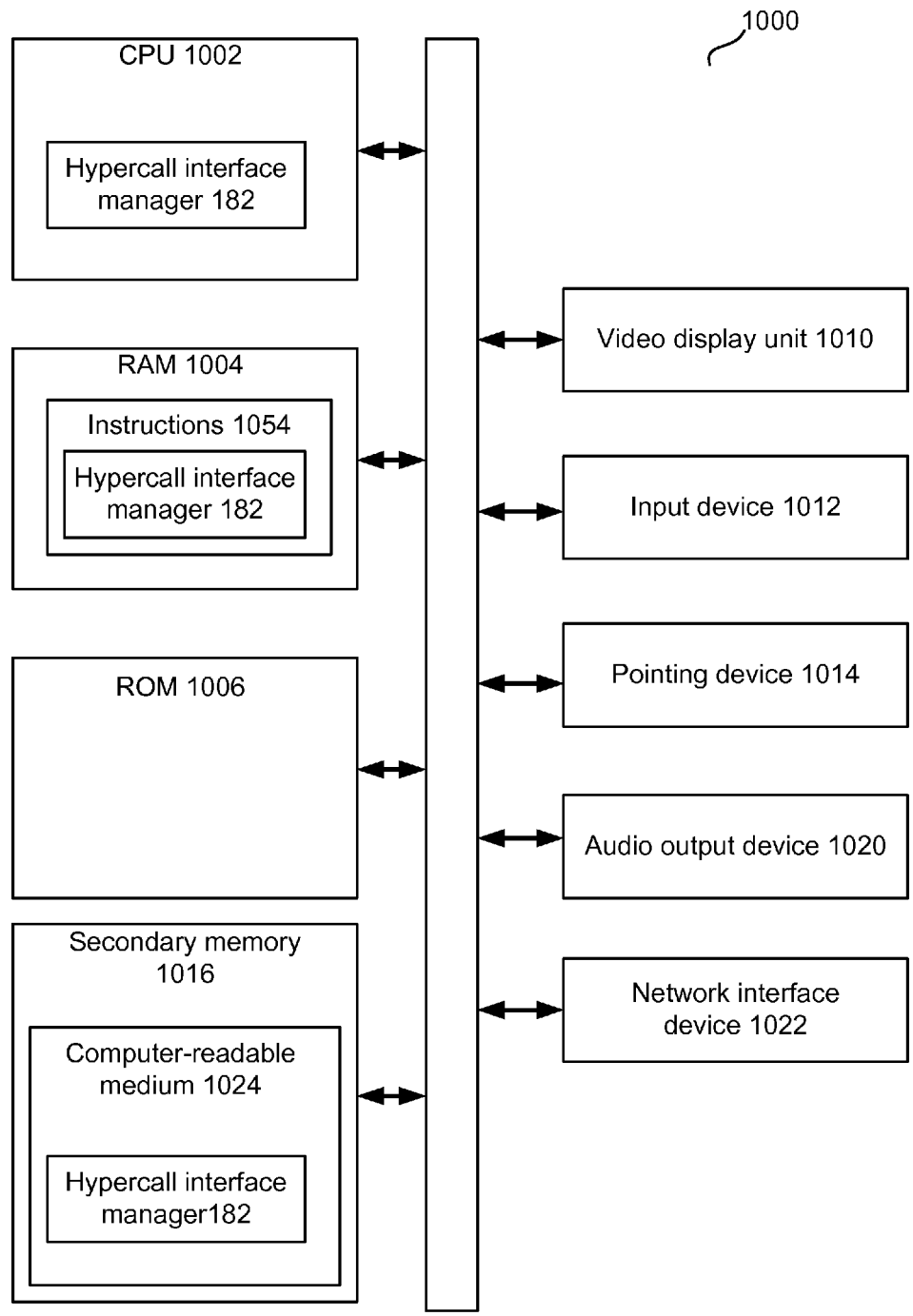
FIG. 4 depicts a block diagram of an illustrative computer system operating in accordance with examples of the present disclosure.

FIG. 4 depicts an example computer system 1000 within which a set of instructions, for causing the computer system to perform any one or more of the methods described herein, may be executed. In certain embodiments, computer system 1000 may correspond to host computer system 100 of FIG. 1.

In certain embodiments, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" includes any collection of computers that individually or jointly execute a set (or multiple sets) of instructions to perform any one or more of the methods described herein.

In a further aspect, the computer system 1000 may include a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

The processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

The computer system 1000 may further include a network interface device 1022. The computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

The secondary memory 1016 may include a non-transitory computer-readable storage medium 1024 on which may be stored instructions of the hypercall interface manager component 182. Instructions of the hypercall interface manager component 182 may also reside, completely or partially, within the main memory 1004 and/or within the processor 1002 during execution thereof by the computer system 1000, hence, the main memory 1004 and the processor 1002 may also constitute machine-readable storage media.

While the computer-readable storage medium 1024 is shown in the illustrative embodiment as a single medium, the term "computer-readable storage medium" includes a single medium or multiple media (e.g., a centralized or distributed database, and/or associated caches and servers) that store the one or more sets of executable instructions. The term "computer-readable storage medium" also includes any non-transitory medium that is capable of storing or encoding a set of instructions for execution by a computer that cause the computer to perform any one or more of the methods described herein. The term "computer-readable storage medium" includes, but is not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Embodiments described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the embodiments described. The scope of the disclosure should be determined with reference to the following claims, along with the full scope of equivalents to which the claims are entitled.

The invention claimed is:

1. A method, comprising:
   receiving, by a hypervisor executed by a processor, a hypercall instruction issued by a virtual machine to invoke a hypervisor function, wherein the hypercall instruction is located within a hypercall entry of a plurality of hypercall entries in a hypercall page residing within an address space of the virtual machine, wherein each of the plurality of hypercall entries has a same size;
   storing, in a general purpose register of the virtual machine, an input parameter for the hypervisor function;
   reading a value of an instruction pointer of the virtual machine, the value indicating an address of the hypercall entry within the hypercall page, wherein an identifier of the hypervisor function is neither stored in nor read from the general purpose register;
   determining a difference between the value of the instruction pointer of the virtual machine and an address of a start of the hypercall page without storing or reading from the general purpose register;
   determining a hypercall entry number of the hypercall entry corresponding to the hypercall instruction within the hypercall page in view of the difference divided by the size of the hypercall entry without storing or reading from the general purpose register, wherein the hypercall entry number is not stored in the general purpose register; and
   executing the hypervisor function by calling the hypercall instruction located within the hypercall entry having the hypercall entry number.

2. The method of claim 1, wherein the hypercall instruction is represented by one of: a VMCALL instruction or a VMMCALL instruction.

3. The method of claim 1, wherein determining the hypercall entry number is performed in view of a subset of bits of the instruction pointer of the virtual machine.

4. The method of claim 1, further comprising determining a hypercall interface type in view of a subset of bits of the instruction pointer of the virtual machine.

5. The method of claim 1, wherein a hypercall interface type is provided by one of: a KVM hypercall interface, a Hyper-V interface, or a Xen interface.

6. The method of claim 1, further comprising providing the hypercall page comprising a plurality of hypercall entries, each hypercall entry including a corresponding hypercall instruction.

7. The method of claim 6, wherein providing the hypercall page is performed by one of: the hypervisor or the virtual machine.

8. The method of claim 1, further comprising storing, in the general purpose register of the virtual machine, an argument for the hypervisor function.

9. The method of claim 1, further comprising storing, in the general purpose register of the virtual machine, an output parameter of the hypervisor function.

10. A system comprising: a memory; and
    a processor, operatively coupled to the memory, to:
    receive, by a hypervisor executed by the processor, a hypercall instruction issued by a virtual machine to invoke a hypervisor function, wherein the hypercall instruction is located within a hypercall entry of a plurality of hypercall entries in a hypercall page residing within an address space of the virtual machine, wherein each of the plurality of hypercall entries has a same size; and
    store, in a general purpose register of the virtual machine, an input parameter for the hypervisor function;
    read a value of an instruction pointer of the virtual machine, the value indicating an address of the hypercall entry within the hypercall page, wherein an identifier of the hypervisor function is neither stored in nor read from the general purpose register;
    determine a difference between the value of the instruction pointer of the virtual machine and an address of a start of the hypercall page without storing or reading from the general purpose register;
    determine a hypercall entry number of the hypercall entry corresponding to the hypercall instruction within the hypercall page in view of the difference divided by the size of the hypercall entry without storing or reading from the general purpose register, wherein the hypercall entry number is not stored in the general purpose register; and
    execute the hypervisor function by calling the hypercall instruction located within the hypercall entry having the hypercall entry number.

11. The system of claim 10, wherein the processor to determine the hypercall entry number in view of a subset of bits of the instruction pointer of the virtual machine.

12. The system of claim 10, wherein the processor further to determine a hypercall interface type in view of a subset of bits of the instruction pointer of the virtual machine.

13. The system of claim 10, wherein the processor further to provide the hypercall page comprising a plurality of hypercall entries, each hypercall entry including a corresponding hypercall instruction.

14. The system of claim 10, wherein the processor further to store, in the general purpose register of the virtual machine, an argument for the hypervisor function.

15. A computer-readable non-transitory storage medium comprising executable instructions that, when
    executed by a processor, cause the processor to:
    receive, by a hypervisor executed by the processor, a hypercall instruction issued by a virtual machine to invoke a hypervisor function, wherein the hypercall instruction is located within a hypercall entry of a plurality of hypercall entries in a hypercall page residing within an address space of the virtual machine, wherein each of the plurality of hypercall entries has a same size;
    store, in a general purpose register of the virtual machine, an input parameter for the hypervisor function;
    read a value of an instruction pointer of the virtual machine, the value indicating an address within the hypercall page;
    read a value of an instruction pointer of the virtual machine, the value indicating an address of the hypercall entry within the hypercall page, wherein an identifier of the hypervisor function is neither stored in nor read from the general purpose register;
determine a difference between the value of the instruction pointer of the virtual machine and an address of a start of the hypercall page without storing or reading from the general purpose register;
determine a hypercall entry number of the hypercall entry corresponding to the hypercall instruction within the hypercall page in view of the difference divided by the size of the hypercall entry without storing or reading from the general purpose register, wherein the hypercall entry number is not stored in the general purpose register; and
execute the hypervisor function by calling the hypercall instruction located within the hypercall entry having the hypercall entry number.

* * * * *